(12) United States Patent
Mehra et al.

(10) Patent No.: US 11,735,916 B2
(45) Date of Patent: Aug. 22, 2023

(54) AUTONOMOUS ELECTRICAL GRID MANAGEMENT

(71) Applicant: EnergyHub, Inc., Brooklyn, NY (US)

(72) Inventors: Varun Mehra, New York City, NY (US); Benjamin Hertz-Shargel, Roslyn Estates, NY (US); Andrew Kontaxis, Allendale, NJ (US); William Cybriwsky, Brooklyn, NY (US)

(73) Assignee: EnergyHub, Inc., Brooklyn, NY (US)

( * ) Notice: Subject to any disclaimer, the term of this patent is extended or adjusted under 35 U.S.C. 154(b) by 120 days.

(21) Appl. No.: 17/028,421

(22) Filed: Sep. 22, 2020

(65) Prior Publication Data
US 2022/0094163 A1 Mar. 24, 2022

(51) Int. Cl.
*H02J 3/14* (2006.01)
*G05F 1/66* (2006.01)
*G06Q 50/06* (2012.01)
*H02J 3/00* (2006.01)

(52) U.S. Cl.
CPC ............ *H02J 3/004* (2020.01); *G05F 1/66* (2013.01); *G06Q 50/06* (2013.01); *H02J 3/14* (2013.01); *H02J 2203/20* (2020.01)

(58) Field of Classification Search
CPC .. G05F 1/66; G06Q 50/06; H02J 3/004; H02J 3/14; H02J 2203/20; Y02B 70/3225; Y02E 60/00; Y04S 20/222; Y04S 40/20
See application file for complete search history.

(56) References Cited

U.S. PATENT DOCUMENTS

| 6,785,592 | B1 | 8/2004 | Smith et al. |
| 7,908,116 | B2 | 3/2011 | Steinberg |
| 8,386,087 | B2 | 2/2013 | Spicer |
| 9,765,984 | B2 | 9/2017 | Smith et al. |
| 9,807,099 | B2 | 10/2017 | Matsuoka et al. |

(Continued)

FOREIGN PATENT DOCUMENTS

WO    WO 2008/003033    1/2008

OTHER PUBLICATIONS

Office Action in U.S. Appl. No. 16/363,498, dated Nov. 20, 2020, 15 pages.

(Continued)

*Primary Examiner* — M. N. Von Buhr
(74) *Attorney, Agent, or Firm* — Fish & Richardson P.C.

(57) ABSTRACT

Methods, systems, and apparatus, including computer programs encoded on a computer storage medium, for managing an electrical grid by controlling devices connected to the electrical grid. In one aspect, a method comprises: autonomously determining whether a control strategy update criterion is satisfied, and in response to determining that the control strategy update criterion is satisfied: identifying: (i) a plurality of devices connected to the electrical grid, and (ii) one or more objectives to be satisfied by the plurality of devices; generating, for the plurality of devices and for a plurality of controls, simulated data that simulates operation of the plurality of devices based on application of the plurality of controls; and identifying, by an optimization procedure and based on at least the simulated data, a respective control to be applied to each of the plurality of devices to satisfy the objectives.

20 Claims, 5 Drawing Sheets

(56) References Cited

U.S. PATENT DOCUMENTS

| | | | |
|---|---|---|---|
| 10,152,076 B2* | 12/2018 | Aggarwal | G06Q 50/06 |
| 10,241,528 B1 | 3/2019 | Frader-Thompson et al. | |
| 10,461,540 B2* | 10/2019 | Ghaemi | H02J 3/381 |
| 10,592,622 B1* | 3/2020 | Csank | F04D 27/02 |
| 10,673,273 B2* | 6/2020 | Ghaemi | F24F 11/62 |
| 10,746,425 B1 | 8/2020 | Frader-Thompson et al. | |
| 10,770,897 B1 | 9/2020 | Hertz-Shargel et al. | |
| 11,003,146 B2* | 5/2021 | Westervelt | H04L 9/0643 |
| 11,073,849 B1 | 7/2021 | Frader-Thompson et al. | |
| 11,101,664 B2* | 8/2021 | Anisi | G05B 19/042 |
| 11,355,937 B2 | 6/2022 | Hertz-Shargel | |
| 11,462,907 B1 | 10/2022 | Hertz-Shargel et al. | |
| 2005/0047043 A1 | 3/2005 | Schweitzer et al. | |
| 2008/0120068 A1 | 5/2008 | Martin et al. | |
| 2008/0120069 A1 | 5/2008 | Martin et al. | |
| 2010/0114799 A1 | 5/2010 | Black et al. | |
| 2010/0211224 A1 | 8/2010 | Keeling et al. | |
| 2011/0046806 A1 | 2/2011 | Nagel et al. | |
| 2011/0106328 A1 | 5/2011 | Zhou et al. | |
| 2011/0231320 A1 | 9/2011 | Irving | |
| 2012/0053746 A1 | 3/2012 | Drake et al. | |
| 2012/0084063 A1 | 4/2012 | Drees et al. | |
| 2012/0136496 A1 | 5/2012 | Black | |
| 2012/0232701 A1 | 9/2012 | Carty et al. | |
| 2012/0323374 A1 | 12/2012 | Dean-Hendricks et al. | |
| 2013/0024141 A1 | 1/2013 | Marwah et al. | |
| 2013/0090777 A1 | 4/2013 | Lu et al. | |
| 2013/0090791 A1 | 4/2013 | Yeh et al. | |
| 2013/0144451 A1 | 6/2013 | Kumar | |
| 2013/0212410 A1 | 8/2013 | Li et al. | |
| 2013/0231792 A1 | 9/2013 | Ji et al. | |
| 2014/0277761 A1 | 9/2014 | Matsuoka | |
| 2014/0277769 A1 | 9/2014 | Matsuoka | |
| 2014/0330442 A1 | 11/2014 | Obara et al. | |
| 2014/0339316 A1 | 11/2014 | Barooah et al. | |
| 2015/0149135 A1* | 5/2015 | Tervo | G05B 17/02 703/8 |
| 2015/0220069 A1 | 8/2015 | Linehan et al. | |
| 2015/0248118 A1 | 9/2015 | Li | |
| 2015/0295405 A1* | 10/2015 | Black | H02J 4/00 700/295 |
| 2015/0316282 A1 | 11/2015 | Stone et al. | |
| 2016/0077538 A1 | 3/2016 | Berka et al. | |
| 2016/0109147 A1 | 4/2016 | Uno et al. | |
| 2016/0117199 A1 | 4/2016 | Sundaram | |
| 2016/0234972 A1 | 8/2016 | Billet et al. | |
| 2016/0291561 A1 | 10/2016 | Al-Mohssen et al. | |
| 2016/0292205 A1 | 10/2016 | Massey et al. | |
| 2016/0305678 A1 | 10/2016 | Pavlovski et al. | |
| 2016/0378894 A1 | 12/2016 | Yoon | |
| 2017/0003043 A1 | 1/2017 | Thiebaux et al. | |
| 2017/0167742 A1 | 6/2017 | Radovanovic et al. | |
| 2017/0206615 A1 | 7/2017 | Sloop et al. | |
| 2017/0288401 A1 | 10/2017 | Hunnnnon et al. | |
| 2017/0364043 A1 | 12/2017 | Ganti et al. | |
| 2018/0051900 A1 | 2/2018 | Van Goor et al. | |
| 2018/0191197 A1 | 7/2018 | Carr et al. | |
| 2018/0219374 A1 | 8/2018 | Pavlak et al. | |
| 2018/0245809 A1 | 8/2018 | Endel et al. | |
| 2019/0266780 A1 | 8/2019 | Le Floch | |
| 2019/0362529 A1 | 11/2019 | Wedig et al. | |
| 2020/0076193 A1 | 3/2020 | Biris et al. | |
| 2020/0090045 A1 | 3/2020 | Baker | |
| 2020/0293876 A1 | 9/2020 | Phan et al. | |
| 2021/0241117 A1 | 8/2021 | Wang et al. | |
| 2021/0367424 A1* | 11/2021 | Diao | G05B 13/04 |
| 2022/0037916 A1* | 2/2022 | Abbaszadeh | G05B 13/041 |
| 2022/0094172 A1* | 3/2022 | Hertz-Shargel | H02J 3/46 |

OTHER PUBLICATIONS

PCT International Search Report and Written Opinion in International Appln. No. PCT/US2021/049097, dated Nov. 26, 2021, 13 pages.

Chen et al, "Demand Response-Enabled Residential Thermostat Controls," ACEEE, 2008, 1-24-1-36.

Honeywell, "Honeywell Wi-Fi Thermostats Allow Homeowners to Connect With Utilities and Turn Up The Savings," Honeywell, Oct. 1-3, 2013.

Notice of Allowance in U.S. Appl. No. 15/366,212, dated Dec. 19, 2018, 7 pages.

Notice of Allowance in U.S. Appl. No. 15/453,127, dated Apr. 8, 2020, 11 pages.

Office Action in U.S. Appl. No. 15/366,212, dated Jun. 13, 2018, 13 pages.

Office Action in U.S. Appl. No. 15/453,127, dated Jun. 19, 2019, 20 pages.

Office Action in U.S. Appl. No. 15/785,533, dated Aug. 21, 2019, 17 pages.

Para, "Nest Thermostats: The Future of Demand Response Programs?," Powermag, Jul. 2014, 6 pages.

Yoav, "What is Demand Response?," Simple Energy, Jun. 1-6, 2015.

Office Action in U.S. Appl. No. 16/363,498, dated Jun. 22, 2020, 11 pages.

* cited by examiner

AUTONOMOUS ELECTRICAL GRID MANAGEMENT

FIELD

This specification relates to control and optimization of electrical power consuming devices to support operations of an electrical grid.

BACKGROUND

Grid operators may want to manage electrical load, such as electrical power consumption measured in kW, on their grid over a period of time. Specifically, grid operators may want to manage the load on their grid during periods of high energy consumption or periods of high generation of intermittent renewable energy. In order to manage the load, grid operators can implement control strategies for controlling diverse devices aggregated across customer sites, e.g., thermostat controls for thermostat cycling and/or temperature offset, throttling electric vehicle charging equipment, mode/set point changes for water heaters, etc. Implementing control strategies for controlling devices at customer sites may be used for a number of reasons, for example to reduce supply costs that may be particularly high during periods of peak energy consumption or to ensure renewable energy generation is matched with electrical load.

SUMMARY

This specification describes a grid management system implemented as computer programs on one or more computers in one or more locations for continuously controlling a population of devices connected to an electrical grid to implement one or more grid services specified by a grid operator of the electrical grid. Generally, a grid service refers to data characterizing a target (e.g., desired) operational state of the grid, and implementing a grid service refers to controlling the operation of a population of devices connected to the grid to achieve the target operational state defined by the grid service. As part of implementing grid services, the grid management system continuously (e.g., at regular intervals and/or in response to trigger events) updates the control strategy used to control the devices connected to the grid based on monitoring data characterizing the current operational state of the grid and of the device population under control. More specifically, the grid management system simulates the operation of the devices connected to the grid under multiple possible control strategies based on the current monitoring data, and optimizes the control strategy for implementing the grid services using the simulations.

According to one aspect there is provided a grid management system for managing an electrical grid by controlling devices connected to the electrical grid, the grid management system comprising: a manager subsystem that is configured to perform operations comprising autonomously determining whether a control strategy update criterion is satisfied, and in response to determining that the control strategy update criterion is satisfied: identifying: (i) a plurality of devices connected to the electrical grid, and (ii) one or more objectives to be satisfied by the plurality of devices; providing data identifying the devices and the objectives to be satisfied by the devices to an optimization system, wherein the optimization system identifies a respective control to be applied to each device and provides data identifying the respective control to be applied to each device to the manager subsystem; receiving, from the optimization system, the data identifying the respective control to be applied to each device; and transmitting, by a dispatcher system, instructions to cause the respective control to be applied to each device; the optimization system that is configured to perform operations comprising: receiving data identifying: (i) a plurality of devices connected to the electrical grid, and (ii) one or more objectives to be satisfied by the plurality of devices; generating, for the plurality of devices and for a plurality of controls, simulated data that simulates operation of the plurality of devices based on application of the plurality of controls; and identifying, by an optimization procedure and based on at least the simulated data, a respective control to be applied to each of the plurality of devices to satisfy the objectives; and the dispatcher system that is configured to perform operations comprising: transmitting instructions to cause controls to be applied to devices.

In some implementations, generating the simulated data that simulates operation of the plurality of devices based on application of the plurality of controls comprises: obtaining monitoring data that characterizes a current state of the plurality of devices; and simulating operation of the plurality of devices based on application the plurality of controls conditioned on the monitoring data characterizing the current state of the plurality of devices.

In some implementations, autonomously determining whether a control strategy update criterion is satisfied comprises: determining the control strategy update criterion is satisfied at predefined time intervals.

In some implementations, autonomously determining whether a control strategy update criterion is satisfied comprises: determining that a triggering event has occurred based on a current operational state of the electrical grid; and determining that the control strategy update criterion is satisfied based on the occurrence of the triggering event.

In some implementations, identifying one or more objectives to be satisfied by the plurality of devices comprises identifying a target load curve that defines a target for an aggregate load generated by the plurality of devices.

In some implementations, the target load curve: (i) exceeds a baseline load curve over a first target time period, and (ii) is less than the baseline load curve over a second target time period, wherein the baseline load curve defines an aggregate load generated by the plurality of devices if the plurality of devices are not controlled to satisfy the objectives.

In some implementations, generating simulated data that simulates operation of the plurality of devices based on application of the plurality of controls comprises: generating a plurality of simulated load curves, wherein each simulated load curve simulates load generated by a respective device of the plurality of devices based on application of a respective control of the plurality of controls.

In some implementations, identifying the respective control to be applied to each of the plurality of devices to satisfy the objectives comprises: adjusting values of a plurality of weights during a plurality of optimization iterations using the optimization procedure to optimize a loss function, wherein each weight corresponds to a respective simulated load curve, wherein the loss function measures: a sparsity of the values of the plurality of weights, and an error between: (i) an aggregate load curve that is defined by combining the simulated load curves in accordance with the values of the plurality of weights, and (ii) the target load curve; and identifying the respective control to be applied to each of the plurality of devices based on the values of the plurality of weights after a final optimization iteration.

According to another aspect, there is provided a method performed by one or more data processing apparatus, the method comprising: determining a plurality of simulated load curves, wherein each simulated load curve simulates load generated by a respective device from a population of devices based on application of a respective control from a set of controls; adjusting values of a plurality of weights during a plurality of optimization iterations using an optimization technique to optimize a loss function, wherein each weight corresponds to a respective simulated load curve, wherein the loss function measures: a sparsity of the values of the plurality of weights, and an error between: (i) an aggregate load curve that is defined by combining the simulated load curves in accordance with the values of the plurality of weights, and (ii) a target load curve that defines a target for the aggregate load curve; and determining a respective control to be applied to each device from the population of devices based on the values of the plurality of weights after a final optimization iteration.

In some implementations, adjusting the values of the plurality of weights during the plurality of optimization iterations using the optimization technique to optimize the loss function comprises optimizing the loss function subject to a constraint that, for each device from the population of devices, a norm of the values of weights corresponding to simulated load curves for the device has a predefined value.

In some implementations, the norm is a Euclidean norm and the predefined value of the Euclidean norm is one.

In some implementations, adjusting the values of the plurality of weights during the plurality of optimization iterations using the optimization technique to optimize the loss function comprises optimizing the loss function subject to a constraint that the value of each weight be non-negative.

In some implementations, the loss function comprises a sum of a first term that measures the sparsity of the values of the plurality of weights and a second term that measures the error between: (i) the aggregate load curve that is defined by combining the simulated load curves in accordance with the values of the plurality of weights, and (ii) the target load curve that defines the target for the aggregate load curve.

In some implementations, the aggregate load curve is defined by a linear combination of the simulated load curves, wherein each simulated load curve is scaled in accordance with the value of the weight corresponding to the simulated load curve.

In some implementations, determining the respective control to be applied to each device from the population of devices based on the values of the plurality of weights after the final optimization iteration comprises determining, for each device, that the control to be applied to the device is a control corresponding to a simulated load curve having a highest weight value from among all the simulated load curves for the device.

In some implementations, determining a simulated load curve that simulates load generated by a respective device from the population of devices based on application of a respective control from a set of controls comprises: generating a plurality of possible load curves that each simulate load generated by the respective device based on application of the respective control; and determining the simulated load curve by combining the plurality of possible load curves.

In some implementations, the optimization technique is an alternating direction method of multipliers (ADMM) optimization technique.

According to another aspect, there is provided a method performed by one or more data processing apparatus for implementing any of the techniques described herein.

According to another aspect, there is provided a system comprising: one or more computers; and one or more storage devices communicatively coupled to the one or more computers, wherein the one or more storage devices store instructions that, when executed by the one or more computers, cause the one or more computers to perform operations for implementing any of the techniques described herein.

According to another aspect, there are provided one or more non-transitory computer storage media storing instructions that when executed by one or more computers cause the one or more computers to perform operations for implementing any of the techniques described herein.

Particular embodiments of the subject matter described in this specification can be implemented so as to realize one or more of the following advantages.

The grid management system described in this specification enables grid services to be implemented on a grid by continuously controlling devices connected to the grid. In particular, the grid management system can autonomously update the control strategy used to control the devices connected to the grid each time an update criterion is satisfied. For example, the grid management system can update the control strategy on a regular cadence, e.g., at 15 minute intervals, and each time a trigger event occurs, e.g., when a significant fluctuation in the operating state of the grid is detected. The grid management system uses the latest monitoring data characterizing the current state of devices connected to the grid to update the device control strategy each time an update criterion is satisfied. Therefore, the grid management system can continuously update the control strategy to take into account variations in relevant factors affecting implementation of grid services, e.g., variations in weather patterns or in the number of devices that have "opted-out" of the grid service. By implementing grid services using continuous control of devices connected to the grid, the grid management system enables more efficient allocation of resources, e.g., energy resources, than would be possible under a fixed control strategy.

To determine a control strategy for implementing a grid service, the grid management system generates a set of simulated load curves that simulate the effect of applying a variety of feasible controls to each device that is relevant to the grid service, and optimizes over the simulated load curves. Optimizing over the simulated load curves rather than over the space of feasible controls enables the grid management system to perform the optimization even when the simulated load curves are generated using operations without practically computable derivatives. The grid management system optimizes over the simulated load curves by iteratively updating weight values corresponding to the simulated load curves to reduce an error between: (i) an aggregate load curve generated by combining the simulated load curves in accordance with the weight values, and (ii) a target load curve. The grid management system may optimize the weight values to encourage the set of weight values corresponding to the simulated load curves for each device to be: (i) sparse, and (ii) lie on the unit sphere (e.g., by having Euclidean norm equal to 1). Optimizing the weight values in this manner increases the likelihood that, for each device, the weight value for one simulated load curve for the device has a positive value, e.g., near 1, and the weight values for the remaining simulated load curves for the device are near zero. Therefore, optimizing the weight values in this manner reduces ambiguity in determining the control strategy based on the weight values, e.g., by reducing the likelihood that the weight values are evenly distributed across the simulated load curves for a device, or all have values near zero.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
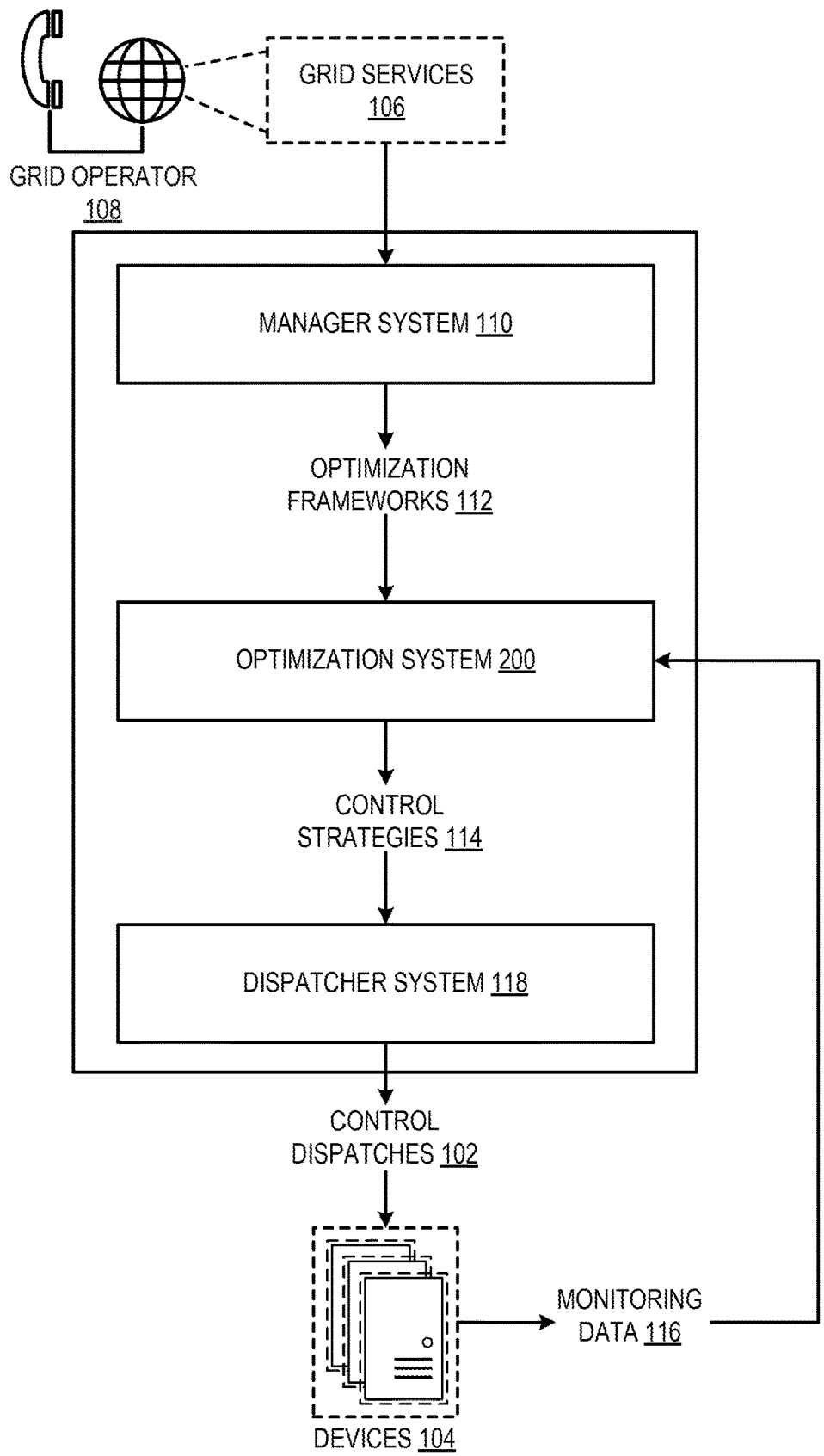
FIG. 1 shows an example grid management system.

FIG. 1 shows an example grid management system 100. The grid management system 100 is an example of a system implemented as computer programs on one or more computers in one or more locations in which the systems, components, and techniques described below are implemented.

The grid management system 100 is configured to continuously generate and transmit control dispatches 102 that define controls for controlling the operation of a set of devices 104 connected to an electrical grid to implement one or more grid services 106 specified by a grid operator 108. The grid operator 108 may be, e.g., a utility system.

A grid service refers to data characterizing a target (e.g., desired) operational state of the grid. More specifically, a grid service may define: (i) a target time period, (ii) a target operational state of the grid during the target time period, and (iii) a fleet (e.g., set) of devices 104 that are targeted by the grid service.

The target time period may be a single time period, e.g., a 3-hour interval of time on a particular day, or a recurring time period, e.g., the same 3-hour interval of time every day. The target time period may include multiple disjoint intervals of time, e.g., the target time period may include the time intervals 6 AM-9 AM and 4 PM-7 PM.

The target operational state of the grid may be represented, e.g., by a target load curve over the target time period. The target load curve may define a respective target for the aggregate load on the grid that is generated by the fleet of devices that are targeted by the grid service at each time point in the target time period. The load generated by a device at a time point refers to a measure of energy usage by the device at the time point. The energy usage by a device at a time point may be, e.g., energy consumption (e.g., if the device is consuming energy from the grid at the time point), or energy injection (e.g., if the device is injecting energy into the grid at the time point). The aggregate load on the grid that is generated by a fleet of devices at a time point refers to an aggregate measure of energy usage by the fleet of devices at the time point, e.g., the net energy usage by the fleet of devices at the time point. The load generated by a device (or a fleet of devices) at a time point may be measured, e.g., in watts, or in any other appropriate unit of measurement.

The fleet of devices that are targeted by the grid service refers to the set of devices that are controlled by the grid management system 100 in accordance with a control strategy to achieve the target operational state of the grid during the target time period. The fleet of devices may be, e.g., devices of a given type (e.g., heating, ventilation, and air conditioning (HVAC) systems, electric vehicle charging equipment, battery energy storage systems, water heaters, etc.) and/or devices that are located in a given geographical region.

A load adjustment service is an example of a grid service, e.g., where the grid operator 108 specifies that the load on the grid should be altered (e.g., increased or decreased) over a target time period relative to a baseline load on the grid. The baseline load may refer the expected load on the grid if a load adjustment service is not implemented, e.g., to alter the baseline load. In one example, a load adjustment service may be a load reduction service which specifies that the load on the grid should be reduced over a target time period, e.g., during periods of expected peak load on the grid. In another example, a load adjustment service may be a load shift service which specifies that the load on the grid should be reduced over certain time period, and increased over other time periods, e.g., during periods of expected peak renewable energy generation on the grid. That is, a load shift service may specify that some load on the grid should be shifted from certain time periods to other time periods, e.g., to shift load away from periods of expected peak load.

A voltage support service is another example of a grid service, e.g., where the grid operator 108 specifies that a portion of the grid (e.g., specified feeders in the electrical distribution network) should request an amount of reactive power to be delivered from devices to support maintaining a target voltage (as will be described in more detail below).

A managed electric vehicle charging service is another example of a grid service, e.g., where the grid operator 108 specifies that electric vehicles should be charged within a certain, daily time period(s) while dynamically ensuring the avoidance of an unintentional peak EV charging power draw within that time period (as will be described in more detail below).

The grid operator 108 may specify grid services 106 to be implemented on the grid through an interface made available by the grid management system 100, e.g., through a portal. The interface may enable the grid operator 108 to specify grid services in a variety of ways.

Figure 3:
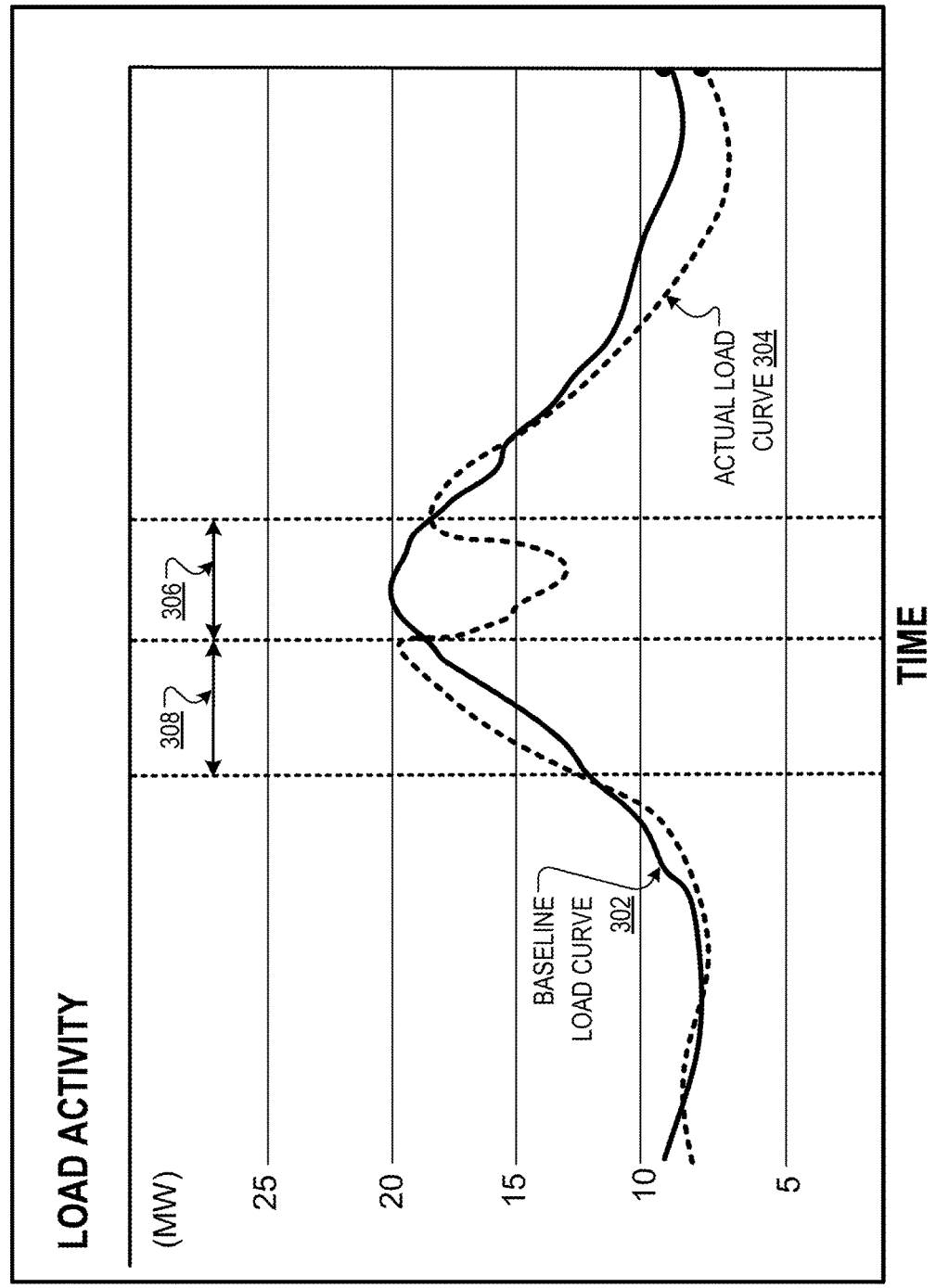
FIG. 3 illustrates an example of the result of performing a load shift grid service.

For example, the interface may enable the grid operator 108 to specify the target operational state of the grid during a target time period by specifying a target load curve over the target time period. In one example, the interface may enable the grid operator 108 to specify a target load curve for the target time period as a function of the expected baseline load curve for the target time period, e.g., by shifting the baseline load curve upwards or downwards by a specified amount. In another example, the interface may enable the grid operator 108 to specify a target load curve for the target time period by specifying a "flat" target load curve, e.g., that specifies a constant load value over the target time period. In another example, the interface may enable the grid operator to specify a target load curve that exceeds the expected baseline load curve over a first target time period, and that is less than the expected baseline load curve over a second target time period. In this example, implementing a grid service to achieve the target load curve may correspond to performing load shift, e.g., by shifting load from the second target time period to the first target time period. FIG. 3, which will be described in more detail below, illustrates an example of the result of implementing a load shift grid service.

As another example, the interface may enable the grid operator 108 to specify the fleet of devices to be targeted by the grid service by indicating, e.g., a type of device to be targeted, or a geographic region such that devices located in the geographic region are targeted. The type of device to be targeted may be, e.g., HVAC devices, electrical vehicle devices, water heating devices, or any other appropriate type of device.

The grid management system 100 may enable the grid operator 108 to specify conditional grid services, e.g., that are to be implemented only if one or more conditions are satisfied. For example, the grid operator 108 may specify a conditional load reduction service that is implemented over a time period only if the baseline load over the time period is forecast (e.g., projected) to exceed an allowable threshold.

The grid management system 100 may enable the grid operator 108 to specify multiple grid services to be jointly implemented on the grid and that differ, e.g., in terms of target time period, target operational state, fleet included in the grid service, or a combination thereof. In some cases, the grid operator 108 may specify "overlapping" grid services, e.g., having overlapping target time periods or overlapping fleets.

The grid management system 100 may enable the grid operator 108 to specify constraints on the implementation of grid services. For example, for a grid service that is implemented by adjusting the set points of HVAC systems, the grid operator 108 may specify that the set point of any HVAC system should not deviate by more than 10% (or some other appropriate amount) from its baseline (e.g., customer-specified) set point. The set point of an HVAC system may define the target temperature to be maintained by the HVAC system. Constraining possible adjustments to baseline HVAC set points may reduce the likelihood of customer comfort being adversely affected during performance of the grid service.

The population of devices 104 connected to the grid may include, e.g., HVAC systems, water heaters, electric vehicles, energy storage devices (e.g., batteries), industrial equipment, or any other appropriate devices. Devices 104 connected to the grid may receive energy through the grid, inject energy into the grid, or both. For example, an energy storage device that is connected to the grid may receive energy through the grid over certain time periods, e.g., while being charged, and inject energy into the grid over other time periods, e.g., by discharging energy into the grid. The devices 104 connected to the grid may be located in customer sites such as, e.g., residential buildings, commercial buildings, data centers, and industrial facilities.

The grid management system 100 may generate new control dispatches 102 for controlling the operation of the population of devices 104 each time a control strategy update criterion is satisfied. A few example techniques for how the grid management system 100 may autonomously determine that a control strategy update criterion is satisfied are described next.

In one example, the grid management system 100 may determine that a control strategy update criterion is satisfied on a regular cadence. In a particular example, the grid management system 100 may determine that a control strategy update criterion is satisfied in accordance with a predefined schedule, e.g., that specifies that a control strategy update criterion is satisfied every 5 minutes, every 15 minutes, or every 30 minutes.

As another example, the grid management system 100 may determine that a control strategy update criterion is satisfied each time the grid operator 108 modifies the grid services being implemented on the grid, e.g., by modifying or removing an existing grid service, or by adding a new grid service.

As another example, the grid management system 100 may determine that a control strategy update criterion is satisfied whenever the grid management system 100 detects determines that a trigger event has occurred. The grid management system 100 may determine that a trigger event has occurred in response to detecting a rapid fluctuation in the operational state of the grid, e.g., if a change in the load on the grid exceeds a threshold amount over a time interval of a predefined duration.

A control dispatch 102 for a device 104 defines a control that is applied to the device to control the operation of the device 104. A control that is applied to a device may be defined by, e.g., an adjustment to the operational parameters of the device, and the time period over which the adjustment to the operational parameters of the device should be implemented to achieve an individual target load curve. For example, a control dispatch 102 for an HVAC device may specify that the temperate set point of the HVAC device should be increased by 2.2 degrees between 3 PM-4 PM. As another example, a control dispatch 102 for a water heater device 104 may specify that the temperature set point for the water heater should be reduced by 4.1 degrees between 11 AM-2PM. As another example, a control dispatch 102 for an electric vehicle may specify that the rate at which the electric vehicle battery is charged should be increased by 7% between 1 AM-4 AM. In some cases, a control to be applied to a device may be defined by multiple adjustments to the operational parameters of the device over respective time periods. For example, a control dispatch 102 for an HVAC device may specify that the temperature set point for the HVAC device should be increased by 2.2 degrees between 3 PM-4 PM, and decreased by 1.7 degrees between 4 PM-5 PM.

In response to determining that a control strategy update criterion is satisfied, the grid management system 100 may generate a new set of control dispatches 102 using a manager system, an optimization system 200, and a dispatcher system, which will each be described in more detail next.

The manager system 110 is configured to determine a respective optimization framework 112 for each grid service 106 to be implemented on the grid. The optimization framework 112 for a grid service 106 may specify: (i) an objective, (ii) a fleet of devices targeted by the grid service, and (iii) a respective set of feasible controls for each device in the fleet of devices. The objective may be a numerical representation of the target operational state of the grid that is specified by the grid service, e.g., a target load curve that represents a target load on the grid over the target time period of the grid service 106. A control for a device may be referred to as a feasible control if it satisfies constraints specified by the grid service 106. For example, the set of feasible controls for an HVAC system may include only those controls that do not cause the temperature set point of the HVAC system to deviate by more than 10% (or some other appropriate amount) from its baseline (e.g., customer-specified) set point.

The optimization system 200 is configured generate a respective control strategy 114 for implementing each grid service 106 based on: (i) the optimization framework 112 for the grid service 106, and (ii) current monitoring data 116 for the fleet of devices specified by the grid service 106. A control strategy 114 for implementing a grid service defines a respective control to be applied to each device in the fleet of devices targeted by the grid service.

The monitoring data 116 for a device refers to refers to data characterizing the current state of the device 104, the environment in the vicinity of the device 104, or both. For example, the grid management system 100 may receive monitoring data 116 for an HVAC system at a site that includes one or more of: the current set point of the HVAC system, the current mode of the HVAC system (e.g., heating mode, cooling mode, or automatic mode), the indoor temperature at the site, the outdoor temperature at the site, humidity at the site, and the weather forecast for the outdoor temperature and humidity at the site. As another example, the grid management system 100 may receive monitoring data 116 for a water heater that includes the current set point of the water heater, the volume of water in a water tank being heated by the water heater, the current rate of inflow to the water tank, the current rate of outflow from the water tank, and the current temperature of the water in the water tank.

The monitoring data 116 for each device may be generated by a variety of processes. For example, certain monitoring data 116 for a device 104 may be generated by one or more sensors (e.g., temperature and humidity sensors) located at or near the site of the device. As another example, certain monitoring data 116 for a device 104 may be obtained from a control system that is configured to control the device 104, e.g., a thermostat that is configured to control an HVAC system. As another example, certain monitoring data 116 for a device 104 may be obtained from a third-party source, e.g., weather forecast data for the geographical region in the vicinity of a site may be obtained from a third-party provider of weather forecast data.

To generate a control strategy 114 for performing a grid service 106, the optimization system 200 simulates the operation of each device in the fleet of devices specified by the grid service 106 under a variety of feasible controls. The optimization system 200 then performs an optimization procedure to determine respective feasible controls to be applied to each device that minimize an error between: (i) the load curve resulting from applying the controls to the devices, and (ii) the target load curve specified by the grid service 106. An example of an optimization system 200 will be described in more detail with reference to FIG. 2.

The dispatcher system 118 generates and transmits control dispatches 102 to the population of devices 104 to realize the control strategies 114 determined by the optimization system 200. More specifically, if the control strategies 114 indicate that a control should be applied to a device 104, then the dispatcher system 118 generates and transmits a control dispatch 102 to a control system of the device that includes instructions defining the control to be applied to the device 104. For example, the dispatcher system 118 may generate and transmit control dispatches to adjust the temperature set points of thermostats controlling HVAC systems in the population of devices 104. The dispatcher system 118 may transmit the control dispatches 102 to the devices 104 over any appropriate communications network, e.g., the internet.

In some cases, the optimization system 200 may determine a control strategy 114 for implementing a grid service 106 that is similar or identical to a control strategy already being performed to implement the grid service 106. In this circumstance, the grid management system 100 may refrain from transmitting control dispatches 102 to the fleet of devices specified by the grid service 106, because doing so may have little or no effect on the control strategy already being used to control the devices.

In some cases, the grid management system 100 can determine that two or more grid services are "conflicting", e.g., when the grid services specify different objectives (e.g., target load curves) over overlapping time intervals. After identifying conflicting grid services, the grid management system 100 can reconcile the conflicting grid services in a variety of ways. For example, the grid management system 100 may identify a prioritization of the conflicting grid services that ranks the conflicting grid services in order of priority. The grid management system 100 may then combine the respective objectives specified by the conflicting grid services in accordance with their prioritization. In one example, the grid management system 100 may determine a combined objective that is specified by a target load curve that is a linear combination of the respective target load curves specified by each conflicting grid service. In this example, the target load curve corresponding to each conflicting grid service may be scaled in the linear combination in proportion to its priority, e.g., such that target load curves corresponding to higher priority grid services are scaled by larger scaling factors. The grid management system 100 may then generate a control strategy 114 and transmit control dispatches 102 for implementing the combined objective of the conflicting grid services. The prioritization of the grid services may be specified, e.g., by the grid operator.

By generating control strategies 114 for implementing the grid services 106 based on the latest monitoring data 116 each time a control strategy update criterion is satisfied, the grid management system 100 can enable continuous control of devices connected to the grid. In particular, the grid management system 100 enables the control strategies performed to implement the grid services 106 to be continuously updated based on the latest monitoring data 116, thereby enabling the control strategies to take into account variations in relevant factors. For example, the control strategies 114 may be dynamically updated to account for variations in weather patterns or in the number of devices that have "opted-out" of grid services, e.g., by disabling the capability of the grid management system 100 to control their operation. Moreover, the grid management system 100 can continuously update the control strategies 114 for implementing the grid services 106 in an autonomous manner, e.g., that requires little or no manual effort by the grid operator 108.

In some implementations, the grid management system 100 may implement a voltage support service, e.g., that requires a specified portion of the grid to maintain a target voltage, by generating control dispatches to support the voltage on the specified portion of the grid. In particular, the grid management system 100 may generate control dispatches for controlling devices that are capable of injecting reactive power into the grid or absorbing reactive power from the grid (e.g., solar/battery inverters) to support maintaining the target voltage on the specified portion of the grid.

In some implementations, the grid management system 100 may implement a managed charging service by charging a target population of electric vehicles in accordance with a schedule of specified daily time period(s). This desired charging schedule may define a partition of a time interval into a sequence of time windows, such that a respective proper subset of the population of electric vehicles is charged in each time window while dynamically ensuring the avoidance of a maximal power draw from the subset of electric vehicles within the specified time period(s). The grid management system 100 may implement the managed charging service by assigning each electric vehicle in the population to a respective time window within the specified time period(s), and generating control dispatches to cause each electric vehicle to start/end charging during its assigned time window within the specified time period(s).

Figure 2:
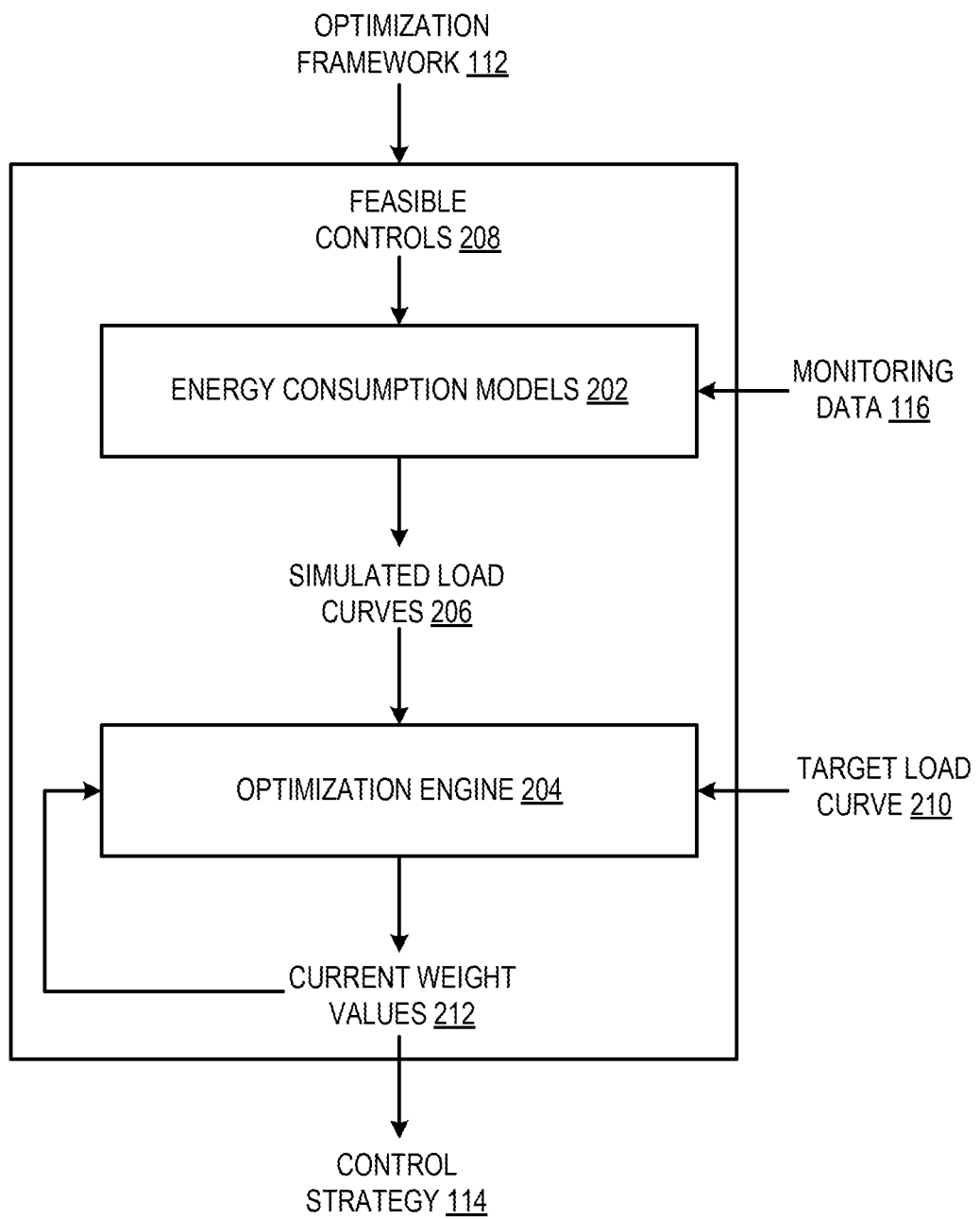
FIG. 2 shows an example optimization system.

FIG. 2 shows an example optimization system 200. The optimization system 200 is an example of a system implemented as computer programs on one or more computers in one or more locations in which the systems, components, and techniques described below are implemented.

The optimization system 200 is configured to generate a control strategy 114 for implementing a grid service based on an optimization framework 112 for the grid service and monitoring data 116 for a fleet of devices targeted by the grid service. The optimization framework 112 identifies: (i) an objective of the grid service, in particular, a target load curve 210 specified by the grid service, and (ii) the fleet of devices targeted by the grid service, and (iii) a set of feasible controls for each device in the fleet of devices. The monitoring data 116 for a device refers to refers to data characterizing the current the state of the device, the environment in the vicinity of the device, or both. Examples of monitoring data 116 are described in more detail above with reference to FIG. 1.

The optimization system 200 generates the control strategy 114 using: (i) a respective device-specific energy consumption model 202 for each device in the fleet of devices specified by the grid service, and (ii) an optimization engine 204, which will each be described in more detail next.

Generally, an energy consumption model 202 for a device may process: (i) a control to be applied to the device, and (ii) monitoring data for the device, in accordance with a set of device-specific energy consumption model parameters to generate one or more load curves. Each of the load curves simulates possible energy consumption by the device over a time period. The values of the energy consumption model parameters for a device may be calibrated based on stored historical data that characterizes: (i) previous energy consumption by the device, and (ii) previous controls applied to the device and monitoring data for the device. In one example, the energy consumption model parameters for an HVAC system at a site may include an internal heat gain parameter (e.g., representing the amount of heat generated at the site due to factors external to the HVAC system) and a thermal product parameter (e.g., representing a product of the thermal capacitance and thermal resistance of the site). Example techniques for determining an energy consumption model for an HVAC system at a site are described with reference to U.S. Pat. No. 10,746,425, which is incorporated by reference herein.

Generally, energy consumption by a device over a time period may be at least partly stochastic, e.g., due to unpredictable variations in the operation of the device. To account for stochasticity in energy consumption by a device, the energy consumption model 202 for the device may enable the generation of multiple load curves simulating possible energy consumption by the device corresponding to the same control and monitoring data for the device. For example, the energy consumption model 202 for the device may process the control and monitoring data for the device to generate a probability distribution over a space of possible load curves, and multiple possible load curves may be sampled in accordance with the probability distribution.

The optimization system 200 may use the energy consumption models 202 to generate a set of simulated load curves 206. Each simulated load curve 206 simulates operation of a respective device from the fleet of devices targeted by the grid service under a respective control from the set of feasible controls 208 for the device. In some cases, the optimization system 200 generates one or more simulated load curves 206 for each control from the set of feasible controls 208 for each device. However, the set of feasible controls 208 for certain devices may be very large. Therefore, generating and subsequently optimizing over simulated load curves 206 for each feasible control 208 for each device may be computationally intensive. To reduce computational resource consumption, the optimization system 200 may randomly sample a subset of controls from the set of feasible controls 208 for each device, and generate simulated load curves for only the sampled subset of feasible controls for each device.

In cases where the optimization system 200 generates multiple simulated load curves for the same feasible control for a device, the optimization system 200 may aggregate the simulated load curves for the feasible control to generate a single load curve. The optimization system 200 may aggregate the simulated load curves for the feasible control, e.g., by averaging or otherwise combining them.

To determine the control strategy 114, the optimization system 200 selects a respective control to be applied to each device to minimize an error between: (i) an aggregate load curve resulting from applying the selected controls, and (ii) the target load curve 210. The aggregate load curve resulting from applying the selected controls may be defined as a sum (or other combination) of the simulated load curves 206 corresponding the selected controls. Determining the control strategy by directly optimizing over the feasible controls (e.g., using a gradient descent optimization technique) may be impractical in certain situations, e.g., if the energy consumption models generate the simulated load curves by using operations without practically computable derivatives. Therefore, rather than directly optimizing over the feasible controls, the optimization system 200 optimizes over the simulated load curves 206.

To optimize over the simulated load curves 206, the optimization system 200 assigns a respective weight value 212 to each simulated load curve 206, and uses an optimization engine 204 to optimize over the weight values 212 to minimize a loss function. The loss function measures an error between: (i) an aggregate load curve that is defined by combining the simulated load curves 206 in accordance with the current weight values 212, and (ii) the target load curve 210. The error between the target load curve 210 and the aggregate load curve may be, e.g., a squared-error. The aggregate load curve may be defined, e.g., as a linear combination of the simulated load curves 206, where each simulated load curve 206 is scaled by the corresponding weight value 212. For example, the optimization engine 204 may determine the aggregate load curve $X_{agg}$ as:

$$X_{agg} = \sum_{i=1..N} \sum_{j=1..M} \alpha_{ij} X_{ij} \qquad (1)$$

where i indexes the devices, N is the number of devices, j indexes the feasible controls for each device, M is the number of feasible controls for each device, $X_{ij}$ denotes the simulated load curve 206 corresponding to device i and feasible control j, and $\alpha_{ij}$ denotes the current weight value 212 corresponding to the simulated load curve $X_{ij}$.

In addition to measuring the error between the aggregate load curve resulting from the weight values 212 and the target load curve 210, the loss function also measures the sparsity of the set of weight values 212 corresponding to the simulated load curves 206 for each device. The sparsity of a set of values characterizes how many of the values are approximately or exactly equal to zero. Therefore, optimizing over the weight values 212 to minimize the loss function further encourages the set of weight values 212 corresponding to the simulated load curves 206 for each device to be sparse, e.g., such that many of the weight values 212 are approximately or exactly equal to zero. The loss function may measure the sparsity of the set of weight values 212 corresponding to the simulated load curves 206 for a device, e.g., by an $L_1$-norm of the set of weight values 212.

The optimization engine 204 may optimize the loss function subject to one or more constraints. For example, the optimization engine 204 may optimize the loss function subject to a constraint that each weight value 212 be non-negative. As another example, the optimization engine 204 may optimize the loss function subject to a constraint on a norm, e.g., a Euclidean norm, of the set of weight values 212 corresponding to the simulated load curves 206 for each device. In a particular example, the constraint may require that the Euclidean norm of the set of weight values 212 corresponding to the simulated load curves 206 for each device have value 1, e.g., constraining the weight values for simulated load curves for each device to lie on a unit hypersphere.

The optimization engine 204 iteratively updates the current weight values 212 to minimize the loss function subject to the constraints over a sequence of optimization iterations. For example, the optimization engine 204 may iteratively update the current weight values 212 to solve the constrained minimization problem given by:

$$\min_{\{\alpha_{ij}\}} \frac{1}{2} \left\| \left( \sum_{i=1..N} \sum_{j=1..M} \alpha_{ij} X_{ij} \right) - X_{target} \right\|_2^2 + \lambda \sum_{i=1..N} |\alpha_i|_1 \quad (2)$$

such that: $|\alpha_i|_2^2 = 1$ for $i \in \{1, \ldots, N\}$, and $\alpha_{ij} \geq 0, i \in \{1, \ldots, N\}, j \in \{1, \ldots, M\}$, where the minimization is performed over the set of weight values $\{\alpha_{ij}\}$, i indexes the devices, N is the number of devices, j indexes the feasible controls for each device, M is the number of feasible controls for each device, $X_{ij}$ denotes the simulated load curve 206 corresponding to device i and feasible control j, $\alpha_{ij}$ denotes the current weight value 212 corresponding to the simulated load curve $X_{ij}$. $|\cdot|_2$ denotes a Euclidean norm, e.g., where $|x|_2^2 = \Sigma x_i^2$, $|\cdot|_1$ denotes an $L_1$ norm, e.g., where $|x|_1 = \Sigma |x_i|$, $X_{target}$ denotes the target load curve, $\lambda$ is a positive hyper-parameter, and $\alpha_i$ denotes the set of weight values corresponding to the simulated load curves for device i.

The optimization engine 204 can use any appropriate optimization technique to iteratively update the current weight values 212 to minimize the loss function subject to the constraints, e.g., an alternating direction method of multipliers (ADMM) technique, e.g., a consensus version of an ADMM technique.

The optimization engine 204 may determine that the optimization of the weight values 212 is complete when a convergence criterion is satisfied, e.g., when a predetermined number of optimization iterations have been performed.

The optimization system 200 may determine the control strategy 114 for implementing the grid service 106 using the current weight values 212 for the simulated load curves 206 after the final optimization iteration. More specifically, the optimization system 200 may select a control to be applied to each device based on the set of weight values 212 corresponding to the simulated load curves 206 for the device. In some implementations, the optimization system 200 may determine that the control to be applied to each device is the control corresponding to the simulated load curve having the highest weight value from among all the simulated load curves for the device. In some implementations, the optimization system 200 may determine a probability distribution over the set of simulated load curves for each device, e.g., by processing the weight values corresponding to the simulated load curves for the device using a soft-max function. The optimization system 200 may then sample a simulated load curve for the device in accordance with the probability distribution over the set of simulated load curves for the device, and then select the control corresponding to the sampled load curve.

The optimization system 200 may optimize the weight values 212 to encourage the set of weight values corresponding to the simulated load curves 206 for each device to be: (i) sparse, and (ii) have a fixed norm, e.g., Euclidean norm equal to 1, as described above. Optimizing the weight values 212 in this manner increases the likelihood that, after the final optimization iteration, the weight value for one simulated load curve for each device has a positive value, e.g., near 1, and the weight values for the remaining load curves for each device are near zero. Therefore, optimizing the weight values 212 in this manner reduces ambiguity in determining the control strategy 114 based on the optimized weight values 212.

In some implementations, the optimization system 200 may take into account a respective price (e.g., measured in dollars per kW, or any other appropriate unit of measurement) associated with electrical energy consumption or injection by each device in the fleet of devices being targeted by the grid service. For example, the optimization system 200 may restrict the set of feasible controls to exclude controls that would increase energy consumption for any device associated with a price for electrical energy consumption that exceeds a threshold value.

In some implementations, the optimization system 200 can determine that one or more devices in the fleet of devices being targeted by the grid service have opted-out of the grid service. A device can be referred to as having opted-out of a grid service, e.g., if a user of the device specifies that only user-provided controls should be applied to the device, rather than controls specified by the grid management system. In response to determining that a device has opted out of a grid service, the optimization system 200 can restrict the set of feasible controls for the device to include only the user-specified control for the device. In some cases, the optimization system 200 may update the control strategy 114 to revert the controls applied to devices that have opted-out of the grid service to user-specified controls without requiring the optimization engine 204 to perform a new optimization.

FIG. 3 illustrates an example of the result of performing a load shift grid service. In a load shift grid service, the target load curve exceeds the baseline load curve in one or more first time periods, and is less than the baseline load curve in one or more second time periods. Implementing the load shift grid service, e.g., by controlling devices connected to the grid to encourage their aggregate load to match the target load curve, results in load being shifted from the second time periods to the first time periods. In the example graph illustrated in FIG. 3, the baseline load curve 302 is represented by a solid line and the actual load curve 304, e.g., resulting from the load shift grid service, is represented as a dashed line. In this example, the actual load curve 304 may be approximately equal to a target load curve specified by the load shift grid service. It can be appreciated that the performing the load shift resulted in load being shifted from the time period 306 of peak baseline load to other time periods, e.g., the earlier time period 308. A grid management system (e.g., as described with reference to FIG. 1) can use an optimization system (e.g., as described with reference to FIG. 2) to optimize how the devices connected to the grid should be controlled to implement the load shift grid service. For example, implementing the load shift grid service may involve a battery charging during the time period 308, and discharging during the time period 306 to inject power into the grid. As another example, implementing the load shift grid service may involve an air conditioning device preemptively cooling a home during the time period 308, and subsequently curtailing cooling activity during the time period 306.

Figure 4:
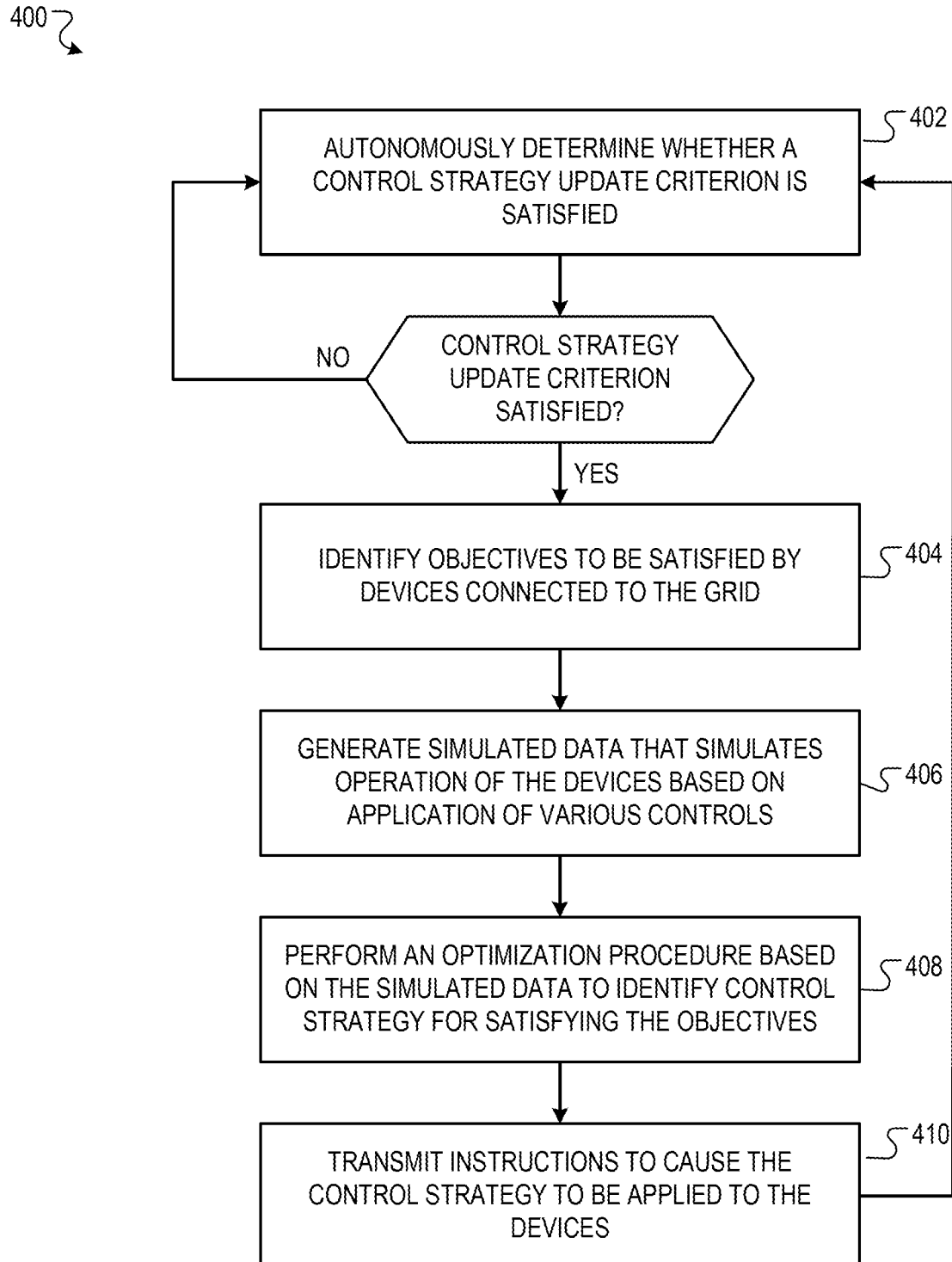
FIG. 4 is a flow diagram of an example process for controlling a population of devices connected to a grid.

FIG. 4 is a flow diagram of an example process 400 for autonomous controlling a population of devices connected to a grid. For convenience, the process 400 will be described as being performed by a system of one or more computers located in one or more locations. For example, a grid management system, e.g., the grid management system 100 of FIG. 1, appropriately programmed in accordance with this specification, can perform the process 400.

The system autonomously determines whether a control strategy update criterion is satisfied (402).

In response to determining that the control strategy update criterion is not satisfied, the system returns to step 402.

In response to determining that the control strategy update criterion is satisfied, the system identifies a population of devices connected to the grid and one or more objectives to be satisfied by the population of devices (404).

The system generates simulated data that simulates the operation of the population of devices based on application of various possible controls to each device in the population of devices (406).

The system performs an optimization procedure based on the simulated data to identify a control strategy that defines a respective control to be applied to each device in the population of devices to satisfy the objectives (408). An example technique for performing the optimization procedure is described in more detail with reference to FIG. 5.

The system transmits instructions to cause the respective control to be applied to each device in the population of devices (410). The system may then return to step 402.

Figure 5:
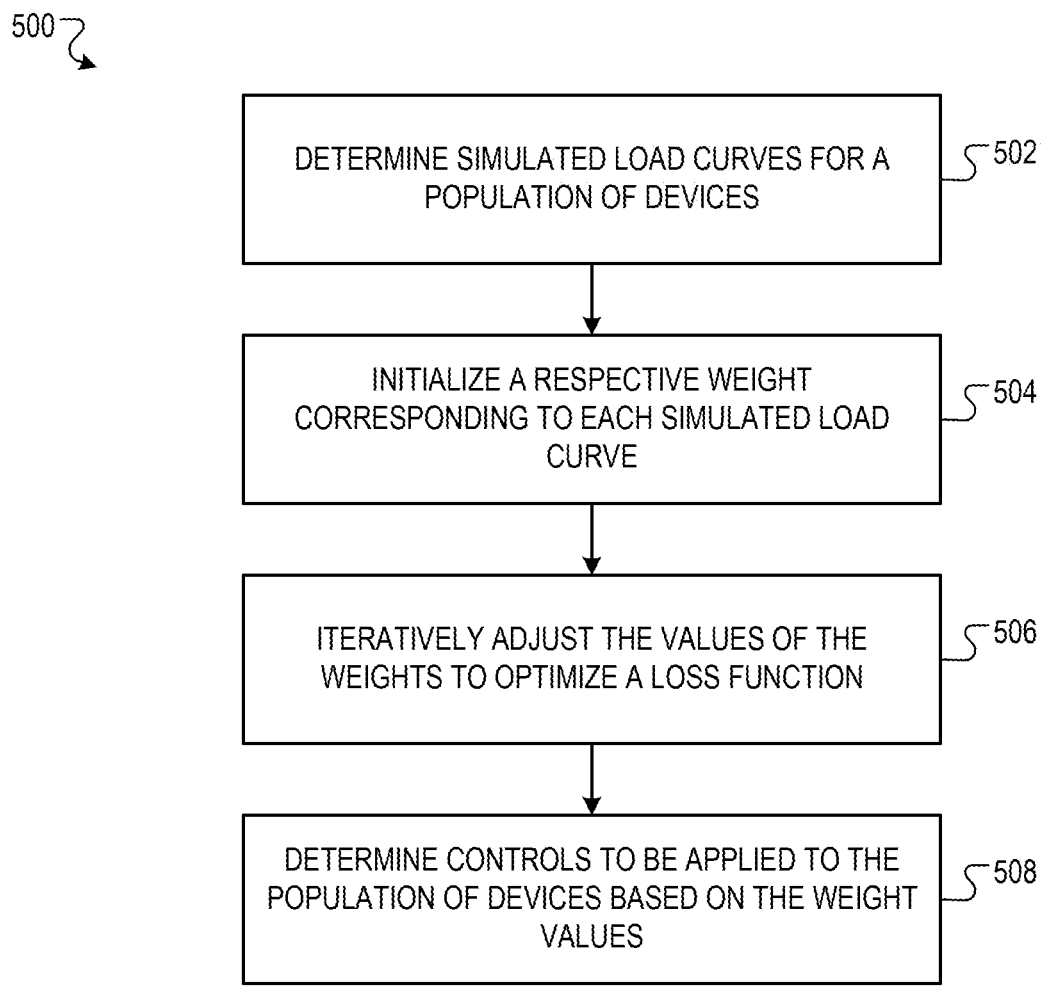
FIG. 5 is a flow diagram of an example process for determining a control strategy for controlling a population of devices connected to an electrical grid to achieve a target load curve.

FIG. 5 is a flow diagram of an example process 500 for determining a control strategy for controlling a population of devices connected to an electrical grid to achieve a target load curve. For convenience, the process 500 will be described as being performed by a system of one or more computers located in one or more locations. For example, an optimization system, e.g., the optimization system 200 of FIG. 2, appropriately programmed in accordance with this specification, can perform the process 500.

The system determines a set of simulated load curves for the population of devices (502). Each simulated load curve simulates load generated by a respective device from the population of devices based on application of a respective control from a set of controls.

The system initializes the value of a respective weight corresponding to each simulated load curve, e.g., as a default value (504).

The system iteratively adjusts the values of the weights during a sequence of optimization iterations using an optimization technique to optimize a loss function (506). The loss function measures both: (i) a sparsity of the values of the weights, and (ii) an error between the target load curve and an aggregate load curve that is defined by combining the simulated load curves in accordance with the values of the weights.

The system determines a respective control to be applied to each device from the population of devices based on the values of the weights after a final optimization iteration (508).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for controlling devices connected to an electrical grid, the system comprising:
   a manager subsystem that is configured to perform operations comprising, at each time point in a sequence of multiple time points:
   autonomously determining whether each control strategy update criterion in a set of control strategy update criteria is satisfied at the time point, wherein the set of control strategy update criteria comprises at least one of:
   a first control strategy update criterion that is satisfied if a measured change in an electrical load on the grid exceeds a threshold amount in a time period prior to the time point; or
   a second control strategy update criterion that depends on a magnitude of the electrical load on the grid at the time point;
   and in response to determining that a control strategy update criterion in the set of control strategy update criteria is satisfied at a time point, updating controls applied to devices connected to the electrical grid, comprising:
   identifying: (i) a plurality of devices connected to the electrical grid, and (ii) one or more objectives to be satisfied by the plurality of devices, wherein:
   the one or more objectives specify a target load curve that defines a target for an aggregated load generated by the plurality of devices; and
   the target load curve: (i) is greater than a baseline load curve over a first target time period, and (ii) is less than the baseline load curve over a second target time period; and
   the baseline load curve defines an aggregate load generated by the plurality of devices if the plurality of devices are not controlled to satisfy the one or more objectives;
   obtaining current monitoring data that characterizes a current operational state of the electrical grid and of the plurality of devices connected to the electrical grid as of the time point;
   providing, to an optimization subsystem, the current monitoring data and data identifying: (i) the plurality of devices connected to the electrical grid, and (ii) the one or more objectives to be satisfied by the plurality of devices, wherein the optimization subsystem identifies a respective control to be applied to each of one or more of the devices to achieve a target operational state of the grid, and provides data identifying the respective control to be applied to each of one or more of the devices to the manager subsystem;
   receiving, from the optimization subsystem, the data identifying the respective control to be applied to each of one or more of the devices to achieve the target operational state of the grid; and
   transmitting, to a dispatcher subsystem, instructions to cause the dispatcher subsystem to instruct the respective control to be applied to each of one or more of the devices;
   the optimization subsystem that is configured to perform operations comprising:
   receiving the current monitoring data the data identifying: (i) the plurality of devices connected to the electrical grid, and (ii) the one or more objectives to be satisfied by the plurality of devices;
   for each of one or more devices of the plurality of devices:
   generating, using the current monitoring data and a model for the device and for a plurality of controls, a plurality of simulated load curves that simulate operation of the device based on application of a respective control of the plurality of controls;
   identifying, by an optimization procedure and based on at least the plurality of simulated load curves for a respective device, a respective control to be applied to the respective device of the plurality of devices to satisfy the objectives; and
   the dispatcher subsystem that is configured to perform operations comprising:
   transmitting instructions to cause the respective control to be applied to each of one or more devices of the plurality of devices.

2. The system of claim 1, wherein generating the plurality of simulated load curves that simulate operation of the device for each device of the plurality of devices based on application of the respective control of the plurality of controls comprises:
   simulating operation of the plurality of devices based on application of the plurality of controls conditioned on the current monitoring data characterizing the current operational state of the grid and of the plurality of devices.

3. The system of claim 1, wherein identifying the respective control to be applied to the respective device of the plurality of devices to satisfy the objectives comprises:
   adjusting values of a plurality of weights during a plurality of optimization iterations using the optimization procedure to optimize a loss function, wherein each weight corresponds to a respective simulated load curve, wherein the loss function measures:
   a sparsity of the values of the plurality of weights, and
   an error between: (i) an aggregate load curve that is defined by combining the simulated load curves in accordance with the values of the plurality of weights, and (ii) the target load curve; and
   identifying the respective control to be applied to each of the plurality of devices based on the values of the plurality of weights after a final optimization iteration.

4. The system of claim 1, wherein receiving the current monitoring data and the data identifying: (i) the plurality of devices connected to the electrical grid, and (ii) the one or more objectives to be satisfied by the plurality of devices comprises:
  receiving data identifying a set of multiple objectives to be satisfied by the plurality of devices, wherein the set of multiple objectives comprises a first objective that conflicts with a second objective.

5. The system of claim 4, wherein the first objective defines a target operational state of the grid over a time interval, and the second objective defines a different target operational state of the grid over the time interval.

6. The system of claim 5, wherein the optimization subsystem is further configured to perform operations comprising:
  receiving, for each objective in the set of objectives, a prioritization score for the objective that defines a priority of the objective; and
  determining a combined objective over the time interval based on the prioritization scores for the first objective and the second objective;
  wherein identifying the respective control to be applied to each of one or more devices of the plurality of devices to satisfy the objectives comprises:
    identifying a respective control to be applied to each of one or more devices of the plurality of devices to satisfy the combined objective over the time interval.

7. The system of claim 6, wherein the first objective defines a first target load curve over the time interval, and the second objective defines a second, different target load curve over the time interval; and
  wherein determining the combined objective over the time interval based on the prioritization scores for the first objective and the second objective comprises:
    determining respective scaling factors for the first objective and the second objective based on their respective prioritization scores; and
    determining the combined objective over the time interval as a combination of: (i) the first target load curve scaled by the scaling factor for the first objective, and (ii) the second target load curve scaled by the scaling factor for the second objective.

8. The system of claim 1, wherein the plurality of devices connected to the grid comprises an energy storage device; and
  wherein transmitting instructions to cause the respective control be applied to each of one or more devices of the plurality of devices comprises:
    transmitting instructions to the energy storage device to inject energy into the grid.

9. The system of claim 8, wherein the energy storage device comprises a battery.

10. The system of claim 1, wherein the set of control strategy update criteria further comprises:
  a third control strategy update criterion that is satisfied if a new objective is added to the one or more objectives to be satisfied by the plurality of devices; and
  a fourth control strategy update criterion that is satisfied if an objective is removed from the one or more objectives to be satisfied by the plurality of devices.

11. The system of claim 1, wherein the second target time period is before the first target time period.

12. A method performed by one or more data processing apparatus for controlling devices connected to an electrical grid, the method comprising:
  autonomously determining, at each time point in a sequence of multiple time points, whether each control strategy update criterion in a set of control strategy update criteria is satisfied at the time point, wherein the set of control strategy update criteria comprises at least one of:
    a first control strategy update criterion that is satisfied if a measured change in an electrical load on the grid exceeds a threshold amount in a time period prior to the time point; or
    a second control strategy update criterion that depends on a magnitude of the electrical load on the grid at the time point;
  and in response to determining that a control strategy update criterion in the set of control strategy update criteria is satisfied at a time point, updating controls applied to devices connected to the electrical grid, comprising:
    identifying: (i) a plurality of devices connected to the electrical grid, and (ii) one or more objectives to be satisfied by the plurality of devices, wherein:
      the one or more objectives specify a target load curve that defines a target for an aggregated load generated by the plurality of devices; and
      the target load curve: (i) exceeds a baseline load curve over a first target time period, and (ii) does not exceed the baseline load curve over a second target time period; and
      the baseline load curve defines an aggregate load generated by the plurality of devices if the plurality of devices are not controlled to satisfy the one or more objectives;
    obtaining current monitoring data that characterizes a current operational state of the electrical grid and of the plurality of devices connected to the electrical grid as of the time point;
    processing data identifying: (i) the plurality of devices connected to the electrical grid, and (ii) the one or more objectives to be satisfied by the plurality of devices, to identify a respective control to be applied to each of one or more of the devices to achieve a target operational state of the grid, comprising:
      for each of one or more devices of the plurality of devices:
        generating, using the current monitoring data and a model for the device and for a plurality of controls, a plurality of simulated load curves that simulate operation of the device based on application of a respective control of the plurality of controls;
      identifying, by an optimization procedure and based on at least the plurality of simulated load curves for a respective device, a respective control to be applied to the respective device of the plurality of devices to satisfy the objectives;
    transmitting instructions to cause the respective control to be applied to each of one or more of the devices of the plurality of devices.

13. The method of claim 12, wherein generating the plurality of simulated load curves that simulate operation of the device for each device of the plurality of devices based on application of the respective control of the plurality of controls comprises:
  simulating operation of the plurality of devices based on application of the plurality of controls conditioned on the current monitoring data characterizing the current operational state of the grid and of the plurality of devices.

14. The method of claim 12, wherein identifying the respective control to be applied to the respective device of the plurality of devices to satisfy the objectives comprises:

adjusting values of a plurality of weights during a plurality of optimization iterations using the optimization procedure to optimize a loss function, wherein each weight corresponds to a respective simulated load curve, wherein the loss function measures:
- a sparsity of the values of the plurality of weights, and
- an error between: (i) an aggregate load curve that is defined by combining the simulated load curves in accordance with the values of the plurality of weights, and (ii) the target load curve; and identifying the respective control to be applied to each of the plurality of devices based on the values of the plurality of weights after a final optimization iteration.

15. A method performed by one or more data processing apparatus for controlling devices connected to an electrical grid, the method comprising:

autonomously determining, at each time point in a sequence of multiple time points, whether each control strategy update criterion in a set of control strategy update criteria is satisfied at the time point, wherein the set of control strategy update criteria comprises at least one of:
- a first control strategy update criterion that is satisfied if a measured change in an electrical load on the grid exceeds a threshold amount in a time period prior to the time point; or
- a second control strategy update criterion that depends on a magnitude of the electrical load on the grid at the time point;

and in response to determining that a control strategy update criterion in the set of control strategy update criteria is satisfied at a time point, updating controls applied to devices connected to the electrical grid, comprising:

identifying: (i) a plurality of devices connected to the electrical grid, and (ii) a set of multiple objectives to be satisfied by the plurality of devices;

obtaining current monitoring data that characterizes a current operational state of the electrical grid and of the plurality of devices connected to the electrical grid as of the time point;

processing data identifying: (i) the plurality of devices connected to the electrical grid, and (ii) the set of multiple objectives to be satisfied by the plurality of devices, to identify a respective control to be applied to each of one or more of the devices to achieve the set of multiple objectives, comprising:

for each of one or more devices of the plurality of devices, generating, using the current monitoring data and a model for the device and for a plurality of controls, a plurality of simulated load curves that simulate operation of the device based on application of a respective control of the plurality of controls;

identifying, by an optimization procedure and based on at least the plurality of simulated load curves for a respective device, a respective control to be applied to the respective device of the plurality of devices to satisfy the objectives, comprising:

determining that the set of multiple objectives comprises a first objective that conflicts with a second objective, wherein the first objective and the second objective define conflicting target operational states of the grid over a time interval;

obtaining, for each of the first objective and the second objective, a respective prioritization score for the objective that defines a priority of the objective;

determining a combined objective over the time interval based on the prioritization scores for the first objective and the second objective; and identifying, by the optimization procedure, a respective control to be applied to each of one or more devices of the plurality of devices to satisfy the combined objective over the time interval; and transmitting instructions to cause the respective control to be applied to each of one or more of the devices of the plurality of devices.

16. The method of claim 15, wherein the first objective defines a first target load curve over the time interval, and the second objective defines a second, different target load curve over the time interval; and wherein determining the combined objective over the time interval based on the prioritization scores for the first objective and the second objective comprises:
- determining respective scaling factors for the first objective and the second objective based on their respective prioritization scores; and
- determining the combined objective over the time interval as a combination of: (i) the first target load curve scaled by the scaling factor for the first objective, and (ii) the second target load curve scaled by the scaling factor for the second objective.

17. The method of claim 15, wherein the set of control strategy update criteria comprises a third control strategy update criterion that is satisfied if a new objective is added to the one or more objectives to be satisfied by the plurality of devices.

18. The method of claim 15, wherein the set of control strategy update criteria comprises a fourth control strategy update criterion that is satisfied if an objective is removed from the one or more objectives to be satisfied by the plurality of devices.

19. The method of claim 15, wherein generating the plurality of simulated load curves that simulate operation of the device for each device of the plurality of devices based on application of the respective control of the plurality of controls comprises:

simulating operation of the plurality of devices based on application of the plurality of controls conditioned on the current monitoring data characterizing the current operational state of the grid and of the plurality of devices.

20. The method of claim 15, wherein identifying the respective control to be applied to the respective device of the plurality of devices to satisfy the objectives comprises:

adjusting values of a plurality of weights during a plurality of optimization iterations using the optimization procedure to optimize a loss function, wherein each weight corresponds to a respective simulated load curve, wherein the loss function measures:
- a sparsity of the values of the plurality of weights, and
- an error between: (i) an aggregate load curve that is defined by combining the simulated load curves in accordance with the values of the plurality of weights, and (ii) a target load curve; and identifying the respective control to be applied to each of the plurality of devices based on the values of the plurality of weights after a final optimization iteration.

\* \* \* \* \*